(12) United States Patent
Marks et al.

(10) Patent No.: US 8,766,018 B2
(45) Date of Patent: Jul. 1, 2014

(54) DIVINYLARENE DIOXIDE RESINS

(75) Inventors: Maurice J. Marks, Lake Jackson, TX (US); E. Joseph Campbell, Missouri City, TN (US)

(73) Assignee: Dow Global Technologies LLC, Midland, MI (US)

( * ) Notice: Subject to any disclaimer, the term of this patent is extended or adjusted under 35 U.S.C. 154(b) by 235 days.

(21) Appl. No.: 13/509,800

(22) PCT Filed: Dec. 8, 2010

(86) PCT No.: PCT/US2010/059349
§ 371 (c)(1),
(2), (4) Date: Aug. 9, 2012

(87) PCT Pub. No.: WO2011/071961
PCT Pub. Date: Jun. 16, 2011

(65) Prior Publication Data
US 2012/0309933 A1    Dec. 6, 2012

Related U.S. Application Data

(60) Provisional application No. 61/267,946, filed on Dec. 9, 2009.

(51) Int. Cl.
| C07C 35/14 | (2006.01) |
| C07D 301/06 | (2006.01) |
| C07D 301/12 | (2006.01) |
| C08G 59/24 | (2006.01) |
| C08G 59/44 | (2006.01) |
| C08G 59/50 | (2006.01) |
| C08G 59/54 | (2006.01) |
| C08G 59/72 | (2006.01) |

(52) U.S. Cl.
USPC ........... 568/822; 525/117; 525/438; 525/523; 549/531; 549/533

(58) Field of Classification Search
None
See application file for complete search history.

(56) References Cited

U.S. PATENT DOCUMENTS

| 2,924,580 | A | 2/1960 | Phillips et al. |
| 3,018,262 | A | 1/1962 | Schroeder |
| 4,404,335 | A | 9/1983 | Cavitt |
| 5,405,688 | A | 4/1995 | Decker et al. |
| 6,153,719 | A | 11/2000 | Abbey et al. |
| 6,242,083 | B1 | 6/2001 | McGrail et al. |
| 6,572,971 | B2 | 6/2003 | Martin |
| 6,632,893 | B2 | 10/2003 | Konarski et al. |
| 6,887,574 | B2 | 5/2005 | Dean et al. |
| 7,037,958 | B1 | 5/2006 | Hansen et al. |
| 7,163,973 | B2 | 1/2007 | Ahsan |
| 8,497,387 | B2 * | 7/2013 | Marks et al. .............. 549/533 |
| 2005/0171237 | A1 | 8/2005 | Patel et al. |
| 2006/0293172 | A1 | 12/2006 | Rubinsztajn et al. |
| 2007/0221890 | A1 | 9/2007 | Gan |

FOREIGN PATENT DOCUMENTS

| EP | 0878472 | 5/1998 |
| WO | 2006052727 | 5/2006 |

OTHER PUBLICATIONS

West, "Derivatives of eugenol and cis- and trans-isoeugenol," Journal of the Chemical Society, 1945, p. 490.*
Ross, "The Reactions of Certain Epoxides in Aqueous Solutions," Journal of the Chemical Society, 1950, pp. 2257-2272.*
Paul Ruggli et al. "Ueber m-Phenylen-di-glykol. (53. Mitteilung ueber Stickstoff-Heterocyclen)", Helvetica chimica acta, verlag Helvetica chimica acta, basel, Ch, vol. 27, Jan. 1, 1994, pp. 1108-1115, XP009148655, ISSN:0018-019x, D0I: (Could not find).
"Handbook of Epoxy Resins," McGraw-Hill Book Company, New York, 1967, Chapter 2.

* cited by examiner

Primary Examiner — Robert Sellers

(57) ABSTRACT

A hydrolyzed divinylarene dioxide resin composition including the reaction product of (a) a divinylarene dioxide, and (b) water; a process for making the hydrolyzed divinylarene dioxide resin composition; and a curable hydrolyzed divinylarene dioxide resin composition made therefrom. The cured product made from the above hydrolyzed divinylarene dioxide resin composition offers improved properties such as a lower viscosity and a high heat resistance compared to known cured products prepared from known epoxy resins.

17 Claims, No Drawings

DIVINYLARENE DIOXIDE RESINS

CROSS REFERENCE TO RELATED APPLICATIONS

This is a §371 application of PCT International Patent Application Number PCT/US2010/059349 filed Dec. 8, 2010, and claims priority from provisional application Ser. No. 61/267,946, filed Dec. 9, 2009, which is incorporated herein by reference in its entirety.

BACKGROUND OF THE INVENTION

1. Field of the Invention

The present invention relates to hydrolyzed divinylarene dioxide resins; and polymers prepared from such hydrolyzed divinylarene dioxide resins.

2. Description of Background and Related Art

It is known to hydrolyze epoxy resins such as by the process described in U.S. Pat. No. 4,404,335. Conventional epoxy resins can be hydrolyzed to convert the resins terminal epoxide groups into glycols. The derived glycol resins are useful intermediates in the preparation of polymers such as polyurethanes and polyesters. Partial hydrolysis of epoxy resins converts a portion of the resins terminal epoxide groups into glycols which enhance the reactivity of the resins remaining epoxide groups with curing agents such as amines. However, said hydrolysis increases the viscosity of the derived epoxy resin.

The most commonly partially hydrolyzed epoxy resin is bisphenol A diglycidyl ether. The use of aliphatic epoxy resins or monofunctional epoxy compounds having a lower viscosity imparts reduced heat resistance in their derived thermosets. Thus, while epoxy resins based on aliphatic epoxy resins can have lower viscosity the resulting polymers based on conventional hydrolyzed aliphatic epoxy resins do not maintain a high heat resistance after polymerization.

It is therefore desired to provide a novel hydrolyzed epoxy resin composition prepared from a divinylarene dioxide; wherein the hydrolyzed epoxy resin has a lower viscosity than those based on conventional hydrolyzed aromatic or aliphatic glycidyl ethers (e.g. less than about 5,000 mPa-s), and which can be reacted with curing agents and/or catalysts to form an epoxy resin thermoset, wherein the derived thermoset exhibits a high heat resistance (e.g. a $T_g$ greater than about 50° C.) upon crosslinking the hydrolyzed epoxy resin composition.

SUMMARY OF THE INVENTION

The problems of the prior art may be addressed by preparing a hydrolyzed epoxy resin composition derived from a divinylarene dioxide in accordance with the present invention.

One embodiment of the present invention is directed to a hydrolyzed epoxy resin composition comprising a reaction product of (a) at least one divinylarene dioxide; (b) water; and optionally (c) a catalyst. The novel compositions of the present invention have a low viscosity (for example, less than about 5,000 mPa-s) while maintaining high heat resistance (for example, a $T_g$ greater than about 50° C.) after polymerizing the resin. In other embodiments, the compositions of the present invention may have a viscosity, for example, from about 5 mPa-s to about 5,000 mPa-s at 25° C.

Another embodiment of the present invention is directed to a polymerizable hydrolyzed epoxy resin composition comprising (i) the above-described hydrolyzed epoxy resin; and (b) at least one curing agent.

Still other embodiments of the present invention are directed to a process for preparing the hydrolyzed epoxy resins described above and a process for preparing the polymerizable resin compositions described above.

Another embodiment of the present invention is directed to thermosets derived from the above curable hydrolyzed epoxy resin compositions having either a significantly reduced viscosity at a similar $T_g$ or a higher $T_g$ at a similar viscosity.

In yet other embodiments, the resulting curable thermoset formulation may be used in various applications, such as for example, as coatings, adhesives, composites, electronics, foams, and the like. Hydrolysis of divinylarene dioxides advantageously provides novel compositions comprising glycol monomers. Complete hydrolysis of divinylarene dioxides provides glycol monomers having essentially no residual epoxide groups. Partial hydrolysis of divinylarene dioxides provides glycol-modified divinylarene dioxide monomers. Therefore, compositions of the present invention are useful for the preparation of polyurethanes, polyesters, and epoxy thermosets in the form of coatings, adhesives, composites, electronics, foams, and the like.

The hydrolyzed and partially hydrolyzed divinylarene dioxide monomers of the present invention have lower viscosity than hydrolyzed epoxy resins of the prior art while maintaining high heat resistance after polymerization.

DETAILED DESCRIPTION OF THE INVENTION

In its broadest scope, the present invention includes a hydrolyzed epoxy resin comprising the reaction product of (a) a divinylarene dioxide; and (b) water to provide a hydrolyzed divinylarene dioxide resin. The resulting hydrolyzed divinylarene dioxide resin may be used to form a curable resin composition or formulation. The resulting curable resin composition or formulation may include one or more optional additives well known in the art.

For example, the novel hydrolyzed divinylarene dioxide resins of the present invention may comprise the reaction product of a divinylarene dioxide, for example a divinylbenzene dioxide (DVBDO); and water.

The hydrolyzed divinylarene dioxide resin compositions comprising the reaction product of divinylarene dioxides and water advantageously provide novel resins having either higher heat resistance or good heat resistance with lower viscosity. Curing these novel resins provide thermosets which maintain their high heat resistance. The hydrolyzed divinylarene dioxide resins of the present invention are suitable for the preparation of thermosets used as composites, an application where a high heat resistance is desirable.

In the present invention, the divinylarene dioxide such as DVBDO may be prepared by reacting a divinylarene and hydrogen peroxide to provide the divinylarene dioxide useful in epoxy resin compositions of the present invention. Such prepared divinylarene dioxide may be used to prepare the hydrolyzed divinylarene dioxide resin of the present invention.

The divinylarene dioxides useful in the present invention, particularly those derived from divinylbenzene such as for example DVBDO, are class of diepoxides which have a relatively low liquid viscosity but impart higher heat resistance and rigidity in its derived thermosets than do conventional epoxy resins. The epoxide group in divinylarene dioxides is significantly less reactive than that in conventional glycidyl ethers used to prepare prior art hydrolyzed epoxy resins.

The divinylarene dioxide useful in the present invention may comprise, for example, any substituted or unsubstituted arene nucleus bearing two vinyl groups in any ring position.

The arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthlalene, tetrahydronaphthalene, and the like. Homologously bonded (substituted) benzenes may consist of biphenyl, diphenylether, and the like.

The divinylarene dioxide used for preparing the composition of the present invention may be illustrated generally by general chemical Structures I-IV as follows:

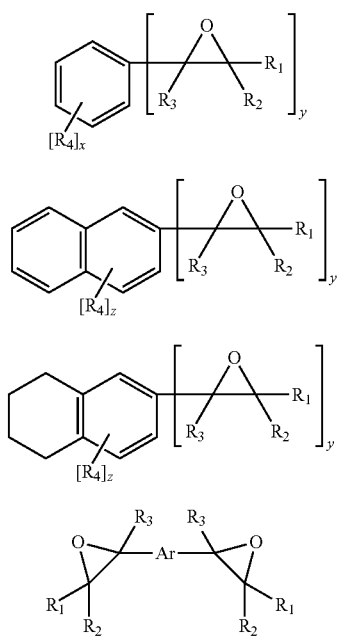

Structure I

Structure II

Structure III

Structure IV

In the above Structures I-IV of the divinylarene dioxide comonomer of the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate; or an RO group, wherein R may be an alkyl, aryl or aralkyl; x may be an integer of 0 to 4; y may be an integer greater than or equal to 2; x+y may be an integer less than or equal to 6; z may be an integer of 0 to 6; z+y may be an integer less than or equal to 8; and Ar is an arene fragment including for example, 1,3-phenylene group.

In one embodiment, the divinylarene dioxide used in the present invention may be produced, for example, by the process described in U.S. Patent Provisional Application Ser. No. 61/141,457, filed Dec. 30, 2008, by Marks et al., U.S. Pat. No. 8,497,387 issued Jul. 30, 2013, incorporated herein by reference. The divinylarene dioxide compositions that are useful in the present invention are also disclosed in, for example, U.S. Pat. No. 2,924,580, incorporated herein by reference.

In another embodiment, the divinylarene dioxide useful in the present invention may comprise, for example, divinylbenzene dioxide, divinylnaphthalene dioxide, divinylbiphenyl dioxide, divinyldiphenylether dioxide, and mixtures thereof.

In a preferred embodiment of the present invention, the divinylarene dioxide used in the epoxy resin formulation may be for example divinylbenzene dioxide (DVBDO). Most preferably, the divinylarene dioxide component that is useful in the present invention includes, for example, a DVBDO as illustrated by the following chemical formula of Structure V:

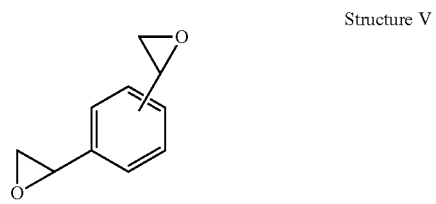

Structure V

The chemical formula of the above DVBDO compound may be as follows: $C_{10}H_{10}O_2$; the molecular weight of the DVBDO is about 162.2; and the elemental analysis of the DVBDO is about: C, 74.06; H, 6.21; and O, 19.73 with an epoxide equivalent weight of about 81 g/mol.

Divinylarene dioxides, particularly those derived from divinylbenzene such as for example DVBDO, are class of diepoxides which have a relatively low liquid viscosity but a higher rigidity and crosslink density than conventional epoxy resins.

Structure VI below illustrates an embodiment of a preferred chemical structure of the DVBDO useful in the present invention:

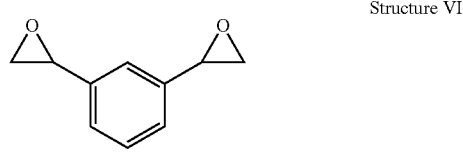 [SMILES: c1cc(C2CO2)cc(C2CO2)c1]

Structure VI

Structure VII below illustrates another embodiment of a preferred chemical structure of the DVBDO useful in the present invention:

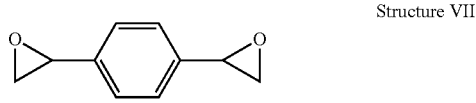 [SMILES: c1cc(C2CO2)ccc1C1CO1]

Structure VII

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) isomer of DVBDO and the para (1,4-DVBDO) isomer of DVBDO, respectively. The ortho isomer is rare; and usually DVBDO is mostly produced generally in a range of from about 9:1 to about 1:9 ratio of meta isomer (Structure VI) to para isomer (Structure VII). The present invention preferably includes as one embodiment a range of from about 6:1 to about 1:6 ratio of Structure VI to Structure VII, and in other embodiments the ratio of Structure VI to Structure VII may be from about 4:1 to about 1:4 or from about 2:1 to about 1:2.

In another embodiment of the present invention, the divinylarene dioxide may contain quantities (such as for example less than about 20 weight percent) of substituted arenes. The amount and structure of the substituted arenes depend on the process used in the preparation of the divinylarene precursor to the divinylarene dioxide. For example, divinylbenzene (DVB) prepared by the dehydrogenation of diethylbenzene (DEB) may contain quantities of ethylvinylbenzene (EVB) and DEB. Upon reaction with hydrogen peroxide, EVB produces ethylvinylbenzene monoxide while DEB remains unchanged. The presence of these compounds can increase the epoxide equivalent weight of the divinylarene dioxide to a value greater than that of a pure divinylarene dioxide compound.

In one embodiment, the divinylarene dioxide, for example DVBDO, useful in the present invention comprises a low viscosity liquid epoxy resin (LER) composition. The viscosity of the divinylarene dioxide used in the process for making the epoxy resin composition of the present invention ranges generally from about 5 mPa-s to about 100 mPa-s, preferably from about 10 mPa-s to about 50 mPa-s, and more preferably from about 10 mPa-s to about 25 mPa-s at 25° C.

One of the advantageous properties of the divinylarene dioxides useful in the present invention is their thermal stability which allows their use in formulations or processing at moderate temperatures (for example, at from about 100° C. to about 200° C.) for up to several hours (for example, for at least about 2 hours) without oligomerization or homopolymerization. Oligomerization or homopolymerization during formulation or processing is evident by a substantial increase in viscosity or gelling (crosslinking). The divinylarene dioxides useful in the present invention have sufficient thermal stability such that the divinylarene dioxides do not experience a substantial increase in viscosity or gelling during formulation or processing at moderate temperatures.

Another advantageous property of the divinylarene dioxide useful in the present invention may be for example rigidity. The rigidity property of the divinylarene dioxide is measured by a calculated number of rotational degrees of freedom of the dioxide excluding side chains using the method of Bicerano described in *Prediction of Polymer Properties*, Dekker, New York, 1993. The rigidity of the divinylarene dioxide used in the present invention may range generally from about 6 to about 10, preferably from about 6 to about 9, and more preferably from about 6 to about 8 rotational degrees of freedom.

The concentration of the divinylarene dioxide used to prepare the hydrolyzed divinylarene dioxide resin of the present invention may range generally from about 99 weight percent (wt %) to about 1 wt %; preferably, from about 99 wt % to about 50 wt %; and more preferably, from about 99 wt % to about 80 wt % based on the combined weight of the composition. The weight % divinylarene dioxide used to prepare the hydrolyzed resin can be varied depending on the degree of hydrolysis desired. If less than a stoichiometric quantity of resin is used then any excess water present in the reaction mixture can be separated from the resin prior to the resins use.

There is no criticality regarding the water, component (b), useful in the present invention; and the water may be obtained from any source. For example, the water useful in the practice of the present invention may be deionized water, tap water, or distilled water.

The amount of water used to prepare the hydrolyzed epoxy resin of the present invention depends on the desired degree of hydrolysis. Generally, the amount of water used may range from about 1 percent (weight %) to about 90 weight %; preferably, from about 1 weight % to about 50 weight %; and more preferably, from about 1 weight % to about 20 weight % based on the combined weight of the composition. The weight % water used to prepare the hydrolyzed resin can be varied depending on the degree of hydrolysis desired. If more than a stoichiometric quantity of water is used then the excess water can be separated from the resin prior to the resins use.

In preparing the hydrolyzed divinylarene dioxide resin of the present invention, optionally at least one hydrolysis catalyst may be used to facilitate the hydrolysis of the divinylarene dioxide compound. The catalyst useful in the present invention may include any hydrolysis catalyst known in the art such as for example metal salts and complexes, ammonium salts, mineral acids, organic acids, ionic exchange resins, supported metal phosphates and zeolites; and mixtures thereof.

In a preferred embodiment, a suitable catalyst employed in the practice of the present invention may include, for example, one or more of the following: lanthanum phosphate, Cs zeolite beta, ion exchange resins, bismuth chloride, tetrabutylammonium bisulfate, tin(IV) porphyrin, iron(III) perchlorate, iron(III) trifluoroacetate, iron(III) chloride, cesium triflate, phosphoric acid, oxalic acid and related compounds. The preferred catalysts include phosphoric acid compounds and heterogeneous metal phosphate catalysts. Other catalysts useful in the present invention may include those described in U.S. Pat. No. 4,404,335; incorporated herein by reference.

The reaction catalyst is generally employed in an amount of from about 0 to about 15, preferably from about 0.01 to about 10; more preferably from about 0.01 to about 8, and most preferably from about 0.01 to about 4, weight percent based on the combined weight of the composition.

Also to facilitate the hydrolysis of the divinylarene dioxide compound, an optional solvent may be used in preparing the hydrolyzed divinylarene dioxide resin of the present invention. For example, one or more organic solvents well known in the art may be used including ketones such as acetone, amides such as dimethylformamide, ethers such as tetrahydrofuran and dioxane, and nitriles such as acetonitrile, and mixtures thereof.

The concentration of the solvent used in the present invention may range generally from 0 wt % to about 90 wt %, preferably from about 0.01 wt % to about 80 wt %, more preferably from about 1 wt % to about 70 wt %, and most preferably from about 10 wt % to about 60 wt % based on the combined weight of the composition.

The preparation of the hydrolyzed divinylarene dioxide resin of the present invention is achieved by adding to a reactor: water, optionally a catalyst, optionally a solvent and a divinylarene dioxide; and then allowing the components to react under reaction conditions to produce the hydrolyzed divinylarene dioxide resin. The components may be mixed in any order. In a preferred embodiment the divinylarene dioxide is the last component added to the reaction. The components are heated until the desired degree of reaction is achieved. The divinylarene dioxide may be at least partially hydrolyzed. The hydrolysis may be from about 1% to about 100% conversion of the epoxide groups. The resulting product is allowed to cool prior to or during isolation and is immediately usable in thermoset formulations.

The process conditions to hydrolyzed divinylarene dioxide include conducting the process at a temperature, generally in the range of from about 25° C. to about 250° C.; preferably, from about 35° C. to about 225° C.; and more preferably, from about 55° C. to about 200° C. The process pressure may be from about 0.1 bar to about 100 bar; preferably, from about 0.5 bar to about 50 bar: and more preferably, from about 0.9 bar to about 10 bar.

The process to hydrolyze the divinylarene dioxide resin of the present invention may be a batch or a continuous. The reactor used in the process may be any reactor and ancillary equipment well known to those skilled in the art.

The novel hydrolyzed divinylarene dioxides have a lower viscosity with high heat resistance of derived thermosets compared to similar epoxides of the prior art.

The viscosity of the hydrolyzed divinylarene dioxide resin prepared by the process of the process of the present invention ranges generally from about 5 mPa-s to about 5,000 mPa-s; preferably, from about 5 mPa-s to about 500 mPa-s; and more preferably, from about 10 mPa-s to about 100 mPa-s at 25° C.

The hydrolyzed divinylarene dioxides of the present invention are useful as the epoxy component in a curable or thermosettable or polymerizable resin formulation or composition.

In another broad aspect of the present invention, a polymerizable hydrolyzed divinylarene dioxide resin composition may be prepared comprising a mixture of: (i) the above described hydrolyzed divinylarene dioxide resin; (ii) a curing agent; and (iii) optionally, other epoxy resins.

The first component (i) of the polymerizable resin composition comprises the hydrolyzed divinylarene dioxide resin as described above.

The concentration of the hydrolyzed divinylarene dioxide resin used in the polymerizable resin mixture of the present invention may range generally from about 99.9 wt % to about 0.1 wt %; preferably, from about 99 wt % to about 1 wt %; and more preferably, from about 90 wt % to about 10 wt % based on the combined weight of the composition. Generally, the amount of hydrolyzed divinylarene dioxide resin used, either alone or in combination with other epoxy resins, is at stoichiometric balance or more based on equivalents compared to that of a co-reactive curing agent functional groups.

The curing agent, component (ii), useful for the polymerizable resin composition of the present invention, may comprise any of the conventional co-reactive or catalytic curing agent materials known in the art to be useful for curing epoxy resin based compositions. The co-reactive curing agents, (also referred to as a hardener or cross-linking agent) useful in the polymerizable or thermosettable resin composition, may be selected, for example, from those co-reactive curing agents well known in the art including, but are not limited to, anhydrides, carboxylic acids, amine compounds, or mixtures thereof. Specific examples of such co-reactive curing agents include, for example, polyamine, polyamide, polyaminoamide, dicyandiamide, polycarboxylic acid and anhydride, and any combination thereof or the like. The catalytic curing agents useful in the thermosettable composition, may be selected, for example, from those catalytic curing agents well known in the art including, but are not limited to, tertiary amines, quaternary ammonium salts such as quaternary ammonium halides, Lewis acids such as boron trifluoride, Lewis acid-amine complexes, or mixtures thereof. Other specific examples of co-reactive curing agent include diaminodiphenylsulfone, styrene-maleic acid anhydride (SMA) copolymers; and any combination thereof. Among the conventional co-reactive epoxy curing agents, amines and amino or amido containing resins and anhydrides are preferred.

Dicyandiamide may be one preferred embodiment of the curing agent useful in the present invention. Dicyandiamide has the advantage of providing delayed curing, that is, since dicyandiamide requires relatively high temperatures for activating its curing properties; dicyandiamide can be added to an epoxy resin and stored at room temperature (about 25° C.).

The amount of the curing agent used in the curable hydrolyzed divinylarene dioxide resin composition generally ranges from about 0 wt % to about 90 wt %, preferably from about 0.01 wt % to about 80 wt %, and more preferably from about 1 wt % to about 70 wt % based on the combined weight of the composition. Generally, the amount of curing agent used is at stoichiometric balance or less based on equivalents compared to that of the epoxide groups.

Curable compositions containing hydrolyzed divinylarene dioxide resins can be adjusted widely to optimize processing and/or cured properties depending on their intended uses. In some uses only minor amounts of hydrolyzed divinylarene dioxide resin are required to achieve significant improvements in formulation cure rates and/or cured formulation properties.

The heat resistance of the hydrolyzed divinylarene dioxide resin based thermoset of the present invention ranges generally from about 50° C. to about 300° C.; preferably, from about 75° C. to about 275° C.; and more preferably, from about 100° C. to about 250° C. as measured by the glass transition temperature ($T_g$) using differential scanning calorimetry (DSC).

In preparing the polymerizable resin composition, blend or mixture of the present invention, in addition to the divinylarene dioxide described above, the mixture may include at least one epoxy resin different than the hydrolyzed divinylarene dioxide resin as described above. Epoxy resins are those compounds containing at least one vicinal epoxy group. The epoxy resin may be saturated or unsaturated, aliphatic, cycloaliphatic, aromatic or heterocyclic and may be substituted. The epoxy resin may also be monomeric or polymeric. The epoxy resin useful in the present invention may be selected from any known epoxy resin in the art. An extensive enumeration of epoxy resins useful in the present invention is found in Lee, H. and Neville, K., "Handbook of Epoxy Resins," McGraw-Hill Book Company, New York, 1967, Chapter 2, pages 257-307; incorporated herein by reference.

The epoxy resins, used in embodiments disclosed herein of the present invention, may vary and include conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

Particularly suitable epoxy resins known to the skilled worker are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known to the skilled worker include reaction products of epichlorohydrin with o-cresol and, respectively, phenol novolacs. It is also possible to use a mixture of two or more epoxy resins.

The epoxy resin useful in the present invention for the preparation of the epoxy resin composition may also be selected from commercially available products. For example, D.E.R.® 331, D.E.R.332, D.E.R. 334, D.E.R. 580, D.E.N. 431, D.E.N. 438, D.E.R. 736, or D.E.R. 732 epoxy resins available from The Dow Chemical Company may be used. As an illustration of the present invention, the epoxy resin may be a liquid epoxy resin, D.E.R. 383 epoxy resin having an epoxide equivalent weight of 175-185, a viscosity of 9.5 Pa-s and a density of 1.16 gms/cc. Other commercial epoxy resins that can be used for the epoxy resin component can be D.E.R. 330, D.E.R. 354, or D.E.R. 332 epoxy resins. D.E.R. is a trademark of The Dow Chemical Company.

Other suitable epoxy resins are disclosed in, for example, U.S. Pat. Nos. 3,018,262, 7,163,973, 6,887,574, 6,632,893, 6,242,083, 7,037,958, 6,572,971, 6,153,719, and 5,405,688, PCT Publication WO 2006/052727; U.S. Patent Application Publication Nos. 20060293172, 20050171237, 2007/0221890 A1; each of which is hereby incorporated herein by reference.

In a preferred embodiment, the epoxy resin useful in the composition of the present invention comprises any aromatic or aliphatic glycidyl ether or glycidyl amine or a cycloaliphatic epoxy resin.

In general, the choice of the epoxy resin used in the present invention depends on the application. However, diglycidyl ether of bisphenol A (DGEBA) and derivatives thereof are particularly preferred. Other epoxy resins can be selected from, but limited to, epoxy resins such as bisphenol F epoxy resins, novolac epoxy resins, glycidylamine-based epoxy resins, alicyclic epoxy resins, linear aliphatic epoxy resins, tetrabromobisphenol A epoxy resins, and combinations thereof.

The optional other epoxy resin may be present in the polymerizable resin composition of the present invention at a concentration ranging generally from about 1 wt % to about 99 wt %, preferably from about 5 wt % to about 95 wt %, and more preferably from about 10 wt % to about 90 wt % based on the combined weight of the composition.

The polymerizable or curable thermosettable resin composition of the present invention may optionally contain one or more other additives which are useful for their intended uses such as for the preparation, storage, and curing of the hydrolyzed epoxy resins. For example, the optional additives which may be used as optional additional components in the polymerizable composition of the present invention composition may include, but not limited to, catalysts, solvents, other resins, stabilizers, fillers, plasticizers, catalyst de-activators, surfactants, flow modifiers, pigments or dyes, matting agents, degassing agents, flame retardants (e.g., inorganic flame retardants, halogenated flame retardants, and non-halogenated flame retardants such as phosphorus-containing materials), toughening agents, curing initiators, curing inhibitors, wetting agents, colorants or pigments, thermoplastics, processing aids, UV blocking compounds, fluorescent compounds, UV stabilizers, inert fillers, fibrous reinforcements, antioxidants, impact modifiers including thermoplastic particles, and mixtures thereof. The above list is intended to be exemplary and not limiting. The preferred additives for the, formulation of the present invention may be optimized by the skilled artisan.

The concentration of the additional additives is generally between about 0 wt % to about 90 wt %; preferably, between about 0.01 wt % to about 80 wt %; more preferably, between about 1 wt % to about 65 wt %; and most preferably, between about 10 wt % to about 50 wt % based on the weight of the total composition.

The preparation of the curable hydrolyzed divinylarene dioxide resin composition of the present invention is achieved by admixing in a vessel the following components: the hydrolyzed divinylarene dioxide resin, a curing agent, optionally a catalyst, and optionally an inert organic solvent; and then allowing the components to formulate into a polymerizable resin composition. There is no criticality to the order of mixture, i.e., the components of the formulation or composition of the present invention may be admixed in any order to provide the thermosettable composition of the present invention. Any of the above-mentioned optional assorted formulation additives, for example fillers, may also be added to the composition during the mixing or prior to the mixing to form the polymerizable resin composition.

All the components of the polymerizable resin composition are typically mixed and dispersed at a temperature enabling the preparation of an effective polymerizable resin composition having a low viscosity for the desired application. The temperature during the mixing of all components may be generally from about 0° C. to about 100° C. and preferably from about 20° C. to about 50° C.

The polymerizable resin composition of the present invention, prepared from the hydrolyzed divinylarene dioxides described above, have improved heat resistance at the same molecular weight; or have a lower viscosity at the same heat resistance compared to known compositions in the art.

The viscosity of the polymerizable resin composition prepared by the process of the present invention ranges generally from about 5 mPa-s to about 5,000 mPa-s; preferably, from about 5 mPa-s to about 500 mPa-s; and more preferably, from about 10 mPa-s to about 100 mPa-s at 25° C.

The heat resistance of the thermoset made from the polymerizable resin composition of the present invention ranges generally from about 50° C. to about 300° C.; preferably, from about 75° C. to about 275° C.; and more preferably, from about 100° C. to about 250° C. as measured by the glass transition temperature ($T_g$) using differential scanning calorimetry (DSC).

The polymerizable or curable formulation or composition of the present invention can be cured under conventional processing conditions to form a thermoset. The resulting thermoset displays excellent thermo-mechanical properties, such as good toughness and mechanical strength, while maintaining high thermal stability.

The process to produce the thermoset products of the present invention may be performed by gravity casting, vacuum casting, automatic pressure gelation (APG), vacuum pressure gelation (VPG), infusion, filament winding, lay up injection, transfer molding, prepreging, dipping, coating, spraying, brushing, and the like.

The curing reaction conditions include, for example, carrying out the reaction under a temperature, generally in the range of from about 0° C. to about 300° C.; preferably, from about 20° C. to about 250° C.; and more preferably, from about 50° C. to about 200° C.

The pressure of the curing reaction may be carried out, for example, at a pressure of from about 0.01 bar to about 1000 bar; preferably, from about 0.1 bar to about bar 100; and more preferably, from about 0.5 bar to about 10 bar.

The curing of the curable or thermosettable composition may be carried out, for example, for a predetermined period of time sufficient to cure the composition. For example, the curing time may be chosen between about 1 minute to about 24 hours, preferably between about 10 minutes to about 12 hours, and more preferably between about 100 minutes to about 8 hours.

The curing process of the present invention may be a batch or a continuous process. The reactor used in the process may be any reactor and ancillary equipment well known to those skilled in the art.

The cured or thermoset product prepared by curing the polymerizable resin composition of the present invention advantageously exhibits an improved balance of thermo-mechanical properties (e.g. transition temperature, modulus, and toughness). The cured product can be visually transparent or opalescent. Compared to analogous thermosets prepared using only conventional epoxy resins, the thermosets prepared using the hydrolyzed epoxy resins of the present invention have a higher $T_g$ (from 10-100% higher than conventional epoxy resins) and higher tensile modulus (from 10-100% higher than conventional epoxy resins).

Tg typically depends on the curing agent and the epoxy resin used. As one illustration, the Tg of the cured hydrolyzed divinylarene dioxide resins of the present invention may be from about 10% to about 100% higher than its corresponding cured conventional hydrolyzed epoxy resin. Generally, the Tg of the cured hydrolyzed divinylarene dioxide resins of the present invention may be from about 50° C. to about 300° C.; and more preferably from about 50° C. to about 250° C.

Similarly, the tensile modulus will depend on the curing agent and the epoxy resin used. As one illustration, the tensile modulus of the cured hydrolyzed divinylarene dioxide resins of the present invention may be from about 10% to about 100% higher than its corresponding cured conventional hydrolyzed epoxy resin. Generally, the tensile modulus of the hydrolyzed divinylarene dioxide resins of the present invention may be from about 100 MPa to about 10,000 MPa; and more preferably from about 1000 MPa to about 7500 MPa.

The hydrolyzed divinylarene dioxide resin compositions of the present invention are useful for the preparation of epoxy thermosets or cured products in the form of coatings, films, adhesives, laminates, composites, electronics, and the like.

As an illustration of the present invention in general, the hydrolyzed divinylarene dioxide resin compositions may be useful for preparing composites for applications such as casting, potting, encapsulation, molding, and tooling.

The following example further illustrates the present invention in detail but is not intended to limit and should not be construed as limiting the scope of the present invention.

$LaPO_4$, $BPO_4$, $AlPO_4$, $ZrPO_4$ and Dowex 1X2 were obtained from the Aldrich Chemical Company and used as received. Cs zeolite beta, Cu zeolite Y, (3/1) Mg/Al hydrotalcite and supported $La(PO_3)_3$ were obtained from Süd Chemie and used as received unless otherwise noted. Ni Takovite was obtained from United Catalyst Incorporated and used as received. Dowex XZ 91419 is a developmental anion resin containing quaternary t-butylamines with a styrene-divinylbenzene backbone and was obtained from The Dow Chemical Company.

Example 1

Divinylbenzene dioxide (EEW=81) is contacted with 1.5 g water/g dioxide at a pressure of 6.5 bar and a temperature of 155° C. for 3 hours. The resulting mixture is allowed to cool to 110° C., and then nitrogen gas is added to the mixture to remove residual water. The resulting partially hydrolyzed, glycol-modified epoxy monomer has an EEW=83 and approximately 5% glycol end groups

Examples 2-10

Divinylbenzene dioxide was contacted with 1.0 g water/g dioxide and 0.07 g of catalyst/g of dioxide as shown in Table 1 at atmospheric pressure and a temperature of 65° C. from 10 through 180 minutes. The resulting mixture was allowed to cool to ambient temperature and samples were analyzed by GC and HPLC to determine conversion and yield. Nitrogen gas was added to the mixture to remove residual water and then it was further dried over $MgSO_4$. The resulting glycol-modified epoxy monomer was nearly quantitatively hydrolyzed to DVBDO-diglycol.

TABLE 1

Hydrolysis of DVBDO over Heterogeneous Catalysts (Hydrolysis Ratio = 1/1).

| | | Conversion (%) | | | |
|---|---|---|---|---|---|
| Example | Catalyst | Time = 10 min | 45 min | 180 min | Yield (%) |
| 2 | $LaPO_4$ | 100 | — | — | 100 |
| 3 | XZ91149 Dowex resin | — | 93.2 | 93.5 | 93.5 |
| 4 | $BPO_4$ | 100 | — | — | 100 |
| 5 | $AlPO_4$ | 100 | — | — | 100 |
| 6* | Cs zeolite Beta | 88.7 | 100 | — | 100 |
| 7 | $ZrPO_4$ | 100 | — | — | 100 |
| 8 | $La(PO_3)_3/SiO_2 \cdot Al_2O_3$ | 100 | — | — | 100 |
| 9 | $La(PO_3)_3/SiO_2$ | 100 | — | 100 | |
| 10 | Cu zeolite Y | — | 100 | — | 100 |

*0.03 g of catalyst/g of dioxide

Comparative Examples A-C

The procedure described for Examples 2-10 was repeated using the catalysts shown in Table 2.

TABLE 2

Comparative Examples.

| | | | Conversion (%) | | | |
|---|---|---|---|---|---|---|
| Example | Catalyst | Unknowns (wt %) | Time = 10 min | 45 min | 180 min | Yield (%) |
| A | Ni Takovite (Toto Cat-1) | 3.9 | — | — | 4.2 | 0.3 |
| B | 1X2 Dowex resin | 0.8 | — | — | 4.2 | 3.8 |
| C | Mg/Al hydrotalcite | 3.8 | — | — | 4.2 | 0.4 |

Layered and acidic metal phosphates and metal exchanged zeolites and macroporous ion exchange resins are excellent catalysts for DVBDO hydrolysis and quantitative conversion to DVBDO-diglycol was achieved (Table 1). Based upon the comparative examples shown in Table 2, layered metal hydroxide catalysts such as hydrotalcite and takovite and micropourous ion exchange resins such as Dowex 1X2 have poor activity (Table 2).

Examples 11-13

Divinylbenzene dioxide was contacted with 0.60 g water/g dioxide and 0.07 g of catalyst/g of dioxide at atmospheric pressure and a temperature of 65° C. for 180 minutes. The resulting mixture was allowed to cool to ambient temperature and samples were analyzed by GC and HPLC to determine conversion and yield. Nitrogen gas was added to the mixture to remove residual water and it then was further dried over $MgSO_4$. The resulting glycol-modified epoxy monomer was near quantitatively hydrolyzed to DVBDO-diglycol.

TABLE 3

Catalyzed Hydrolysis of DVBDO
(Hydrolysis Ratio = 1.5/1)

| Example | Catalyst | Yield (%) |
|---|---|---|
| 11 | Cu zeolite Y | 99.9 |
| 12 | LaPO$_4$ | 96.2 |
| 13 | ZrPO$_4$ | 70.3 |

Example 14

Divinylbenzene dioxide was contacted with 0.40 g water/g dioxide, 0.1 g of LaPO$_4$/g of dioxide and 3.0 mL THF/g dioxide at atmospheric pressure and a temperature of 65° C. for 5 hours. The resulting mixture was chilled in an ice bath, filtered and dried over MgSO$_4$ for 30 minutes. The solvent was removed in vacuo to afford an oil. The resulting oil was dissolved in acetonitrile, filtered to remove a white precipitate and separated from an insoluble 2$^{nd}$ layer. The acetonitrile was removed in vacuo to afford a yellow-tinted oil, yield=65% of DVBDO-monoglycol.

Comparative Example D and Examples 15-17

Formulations containing varying amounts of divinylbenzene dioxide monoglycol (DVBDO-MG) were prepared and allowed to cure at room temperature (about 25° C.). Other formulation components were DVBDO, Cardolite NC541LV (a phenalkamine curing agent from Cardolite Corp.), and Ancamine K-54 (a tertiary amine catalyst from Air Products, Inc.) as shown in Table 4.

TABLE 4

Formulations Containing DVBDO-MG.

| | Comp. Ex. D g | Example 15 g | Example 16 g | Example 17 g |
|---|---|---|---|---|
| DVBDO | 1.97 | 1.84 | 1.68 | 1.53 |
| DVBDO-MG | 0.00 | 0.21 | 0.41 | 0.65 |
| NC541LV | 3.00 | 2.97 | 2.92 | 2.81 |
| Ancamine K-54 (mL) | 0.5 | 0.5 | 0.5 | 0.5 |
| [DVBDO-MG] (phr) | 0 | 10 | 20 | 30 |

Each formulation as shown in Table 4 was mixed by hand in a 20 mL vial for 1 minute and was poured into an Al dish and allowed to cure under ambient conditions. Shore D hardness (as determined by ASTM D2240) and resistance to methylethyl ketone (MEK, by rubbing 100 times with a soaked cotton-tipped applicator) were tested after 18 hours and 24 hours cure times (Table 5).

TABLE 5

Properties of Cured Formulations Containing DVBDO-MG.

| | [DVBDO-MG] | 18 hr. | | 24 hr. | |
|---|---|---|---|---|---|
| Example | (phr) | Hardness | MEK | Hardness | MEK |
| Comp. D | 0 | 35 | mar | 44 | slight mar |
| 15 | 10 | 45 | slight mar | 55 | no mar |
| 16 | 20 | 43 | mar | 50 | slight mar |
| 17 | 30 | 40 | mar | 52 | slight mar |

The results in Table 5 show the unexpected improvement in hardness and MEK resistance using 10 phr of DVBDO-MG in the above formulations.

The invention claimed is:

1. A hydrolyzed divinylarene dioxide resin composition comprising the reaction product of (a) a divinylarene dioxide having a mixture of meta and para isomers, and (b) water; wherein the reaction product formed comprises at least a partially hydrolyzed divinylarene dioxide resin composition.

2. The composition of claim 1, wherein the divinylarene dioxide comprises one or more substituted divinylbenzene dioxides; wherein the one or more substituted divinylbenzene dioxides comprises divinylbenzene dioxide, divinylnaphthalene dioxide, divinylbiphenyl dioxide, divinyldiphenylether dioxide, or mixtures thereof.

3. The composition of claim 1, wherein the divinylarene dioxide is divinylbenzene dioxide.

4. The composition of claim 1, wherein the concentration of said divinylarene dioxide ranges from about 99 weight percent to about 1 weight percent based on the combined weight of the composition.

5. The composition of claim 1, including a hydrolysis catalyst for the hydrolyzation of the divinylarene dioxide resin; wherein the catalyst comprises bismuth chloride, bismuth triflate, tetrabutylammonium bisulfate, tin(IV) porphyrin, iron(III) perchlorate, iron(III) trifluoroacetate, iron(III) chloride, cesium triflate, phosphoric acid, oxalic acid, ion exchange resins, metal phosphates and metal exchanged zeolites or mixtures thereof.

6. The composition of claim 5, wherein the concentration of said catalyst ranges from about 0.01 weight percent to about 10 weight percent based on the combined weight of the composition.

7. A curable hydrolyzed divinylarene dioxide resin composition comprising (i) at least one hydrolyzed divinylarene dioxide resin composition of claim 1; and (ii) at least one curing agent.

8. The curable composition of claim 7, wherein the concentration of the hydrolyzed epoxy resin ranges from about 99 weight percent to about 10 weight percent based on the combined weight of the composition.

9. The curable composition of claim 7, wherein the curing agent comprises anhydrides, carboxylic acids, amine compounds, tertiary amines, quaternary ammonium salts, Lewis acids, Lewis acid-amine complexes; or mixtures thereof.

10. The curable composition of claim 7, wherein the concentration of the curing agent ranges from about 1 weight percent to about 90 weight percent based on the combined weight of the composition.

11. A process for hydrolyzing a divinylarene dioxide epoxy resin comprising reacting (a) a divinylarene dioxide having a mixture of meta and para isomers, (b) water, and (c) optionally, a catalyst; under conditions to provide at least a partially hydrolyzed divinylarene dioxide resin composition.

12. A process for preparing a curable hydrolyzed divinylarene dioxide resin composition comprising admixing (i) a hydrolyzed divinylarene dioxide resin of claim 1; and (ii) at least one curing agent.

13. The process of claim 11, wherein the divinylarene dioxide is divinylbenzene dioxide.

14. The process of claim 13 wherein the reaction product produced from the hydrolysis of divinylbenzene dioxide containing both an organic and liquid phase yields exclusively a dihydrolyzed product.

15. The process of claim 13, wherein the reaction product formed during hydrolysis using a co-solvent for a single liquid phase reaction yields a monohydrolyzed divinylbenzene dioxide as the primary product.

16. The process of claim 13, wherein the reaction product produced comprises divinylbenzene dioxide-diglycol.

17. The process of claim 13, wherein the reaction product formed comprises divinylbenzene dioxide-monoglycol.

* * * * *